United States Patent
Kamen et al.

Patent Number: 5,812,141
Date of Patent: Sep. 22, 1998

[54] METHOD AND APPARATUS FOR AN ADAPTIVE TEXTURE MAPPING CONTROLLER

[75] Inventors: Yakov Kamen, Cupertino; Uma Sabada, Santa Clara, both of Calif.

[73] Assignee: Sun Microsystems, Inc., Palo Alto, Calif.

[21] Appl. No.: 592,285

[22] Filed: Jan. 26, 1996

Related U.S. Application Data

[63] Continuation of Ser. No. 41,073, Apr. 1, 1993, abandoned.

[51] Int. Cl.⁶ .................................................. G06T 11/40
[52] U.S. Cl. ......................................... 345/430; 345/441
[58] Field of Search ................................ 395/130, 125; 345/430, 425, 441

[56] References Cited

U.S. PATENT DOCUMENTS

| | | | |
|---|---|---|---|
| 4,835,532 | 5/1989 | Fant | 345/136 |
| 4,855,934 | 8/1989 | Robinson | 395/130 |
| 5,097,427 | 3/1992 | Lathrop et al. | 395/130 |
| 5,109,481 | 4/1992 | Lathrop et al. | 395/133 |
| 5,179,638 | 1/1993 | Dawson et al. | 395/125 |
| 5,214,753 | 5/1993 | Lee et al. | 395/125 |
| 5,253,339 | 10/1993 | Wells et al. | 395/126 |
| 5,255,352 | 10/1993 | Falk | 395/125 |
| 5,307,450 | 4/1994 | Grossman | 395/123 |
| 5,345,541 | 9/1994 | Kelley et al. | 395/126 |

FOREIGN PATENT DOCUMENTS

A-0 550 244 A2 12/1992 European Pat. Off. .

OTHER PUBLICATIONS

Wolberg, George; *Digital Image Warping;* 1990; pp. 189–204.

"Interpolation for Polygon Texture Mapping & Shading", Paul S. Heckbert, et al. Dept. of Electrical Engineering & Computer Science, University of California Berkeley, pp. 1–11, 1991.

Grand Prix, Supplement Technique, 1991, Tetbury UK, pp. 1–20.

Computer Graphics Principles and Practice by J. Foley et al., 1990, pp. 741–747, 806–807 and 820–826.

Survey of Texture Mapping by P. Heckbert, IEEE CG&A 1986, pp. 56–67.

Texture and Reflection in Computer Generated Images by J. Blinn et al., Communications of the ACM, Oct. 1976, v. 19, No. 10, pp. 542–547.

*Primary Examiner*—Mark K. Zimmerman
*Attorney, Agent, or Firm*—Beyer & Weaver, LLP

[57] ABSTRACT

The present invention provides a method and apparatus for computer graphics system users or other functions in a graphical display system, to trade off object image rendering speed for object image texture quality. This trade-off is accomplished by providing control signals to the adaptive texture mapping controller which indicate the level of texture quality that the user or other function desires. Upon recognizing these control signals, the adaptive texture mapping controller selects a computation method to be used in generating pixel values necessary to provide the desired level of image texture quality. An appropriate method is determined for calculating the end points of span sections of scan lines to be used for the display, based upon a function of the knot parameters which correspond to the vertices which describe each edge of a polygon section of the projected object and one or more of the control signals provided, and then an appropriate interpolation method is determined for calculating the pixel values for pixels on each span chosen. The selected interpolation method is based on a function of the span end points and one or more of the control signals provided. These functions of the distance between knot parameters on a polygon edge or the distance between end points of a span can be mathematical functions of pairs of knot parameters or pairs of end points respectively.

21 Claims, 8 Drawing Sheets

METHOD AND APPARATUS FOR AN ADAPTIVE TEXTURE MAPPING CONTROLLER

This is a file wrapper continuation of application Ser. No. 08/041,073, filed Apr. 1, 1993 now abandoned.

BACKGROUND OF THE INVENTION

1. Field of the Invention

The invention relates generally to the field of Computer Graphics and to computer controlled imaging systems and, more particularly, to a system for adaptively controlling quality/processing-speed trade-offs in mapping texture onto object images for display.

2. Description of the Prior Art

The goal of systems known in the prior art in the field of Computer Graphics has been to provide the finest possible quality of texturing and lighting of computer graphic images at the lowest possible processing cost. To date, certain mathematical models employed provide excellent quality but are nevertheless expensive in terms of processing cost, whereas other models provide lesser quality but are relatively fast (inexpensive) in image rendering. Those which provide excellent quality usually calculate a texturing value for every pixel of every scan line of the video display of the object, whereas the faster methods make use of some type of interpolation scheme for minimizing the numbers of discrete pixel values that must be calculated. Whichever method is employed in a particular Computer Graphics system, the user is constrained to use that method. That is, if the user has a graphics system that provides high quality texture mapping but which is slow in rendering the texture mapped images, he has no option to select lesser quality but faster rendering. If he wishes faster rendering he must load a different graphics program that uses a different texture mapping scheme, or perhaps use a different machine that has implemented a graphics engine system with a faster texture mapping procedure.

For purposes of further discussion, the following definitions will apply: Texture is defined as a modulation of color, intensity, surface normal, transparency, or other surface property applied to a surface of a graphics object in such a way that the pattern appears attached to the surface as the viewpoint and perspective varies. For example, an image of woodgrain could be mapped onto a polygon to simulate a hardwood floor. The image of woodgrain is typically represented by a table of values referred to as a texture map. In general, texture maps are maps which store a set of values which represent a predetermined coloring, pattern or other predefined feature which is to be used to embody the texture on a graphics object. The combination of the graphical representation of the object and the embodied texture then forms a composite which is displayed, pixel by pixel, on a typical video monitor. This process is more fully described with reference to FIG. 1. Depicted in FIG. 1 is a display screen 102 shown displaying a textured object 116, connected to a frame buffer 104 which contains a pixel by pixel bit map of the object 117, a combinor module 112, a texture map memory section 110, a model coordinate space section 105, an object projection memory section 106 and a texture calculator 108. In FIG. 1 the frame buffer 104 contains a value in each location which corresponds to a pixel on the display screen. This value, called the "pixel value", contains data which causes the particular color of the corresponding pixel on the display screen. The problem of displaying an object on a display screen showing some texture on the displayed object, is to find a way to modify these pixel values so that the resulting data output to the screen creates the impression of texture on the object. In general, this is done by first converting the image of the object by projecting it into a two dimensional array, much like the globe of the earth is converted into a two dimensional map. In this process the coordinates of certain points on the object (for example, the coordinates of the vertices of the triangle 118 shown on the object image in the model coordinate space 105) are translated into the coordinates of the corresponding vertices of the projection triangle 120 in the object projection memory section 106. These vertices of the projection triangle 120 are then passed to the texture calculator 108. The texture calculator 108, using the coordinates of the projection vertices and other data about what kind of texture to apply, will extract texture values from the appropriate section of the texture map 110 corresponding to each pixel required for the display of the object. The texture calculator 108 will initially obtain texture values corresponding to the vertices of the projected triangle 120 and thereafter will calculate the texture value of all intermediate pixel locations within the projected triangle in some manner. This may be by linear interpolation between the vertices values or by some other calculation method. In any case, the texture values corresponding to all pixels of the projection triangle 122 (or in general, of the projected polygon) are passed to the combinor module 112 which combines these texture values with any existing pixel values for each pixel to be displayed. This combined set of pixel values 126 is then passed to the frame buffer 104 which drives the display of the textured object 116. In some computer graphics systems, the texture values themselves are not contained in a pre-stored table, such as the texture map 110 described above, but rather are calculated or derived from a mathematical function which is used to model the associated texture values. This process is called procedural or solid texturing. These calculated or generated texture values would just be passed directly to the combinor module 112 for each pixel to be displayed.

In many computer graphics systems, the texture map 110 is a two dimensional array of texture values. The map is computed off-line and stored in a texture map memory in the image generator. The texture value or "texel" associated with a particular pixel is used to modify the intensity or the color of the pixel. The texture map can be a two or three dimensional table of sampled data. This tabular texture map resides in its own (u,v) or (u,v,w) coordinate space. As indicated above, Textures may also be defined procedurally. More generally, Texture mapping means the mapping of a function onto a surface in three dimensions (3D). The domain of the function can be one, two or three dimensional, and it can be represented by either an array or a mathematical function. Texture space is usually labeled (u,v), and object space (x,y,z). For a summary description of Texture and Texture Mapping see the article "Texture" by Franklin C. Crow, on pages 159–187 of the book titled "Computer Graphics Techniques: Theory and Practice", David F. Rodgers and Rae A. Earnshaw, Editors, Springer-Verlag Publishers, 1990, and for a general overview of Texture Mapping methods, see the article "Survey of Texture Mapping" by Paul S. Heckbert, IEEE Computer Graphics and Applications, 6(11), November 1986, pp. 56–67.

One example of a Texture Mapping system is disclosed in U.S. Pat. No. 5,097,427 issued Mar. 17, 1992 to Lathrop et al. (See FIG. 2). This 427 patent discloses a Texture Mapping system which makes use of an interpolation device for interpolating texture values between an initial set of image pixel values. The interpolation device used is described in U.S. Pat. No. 5,109,481 issued Apr. 28, 1992 to Lathrop et al (shown in FIG. 3) which is incorporated by reference into the 427 patent.

This Lathrop system is typical of most prior art graphical display systems in that the system user is stuck with using the the interpolation schemes provided. If for some reason, the user wanted the texture quality that could be provided by actually calculating the texture value at each pixel, he could not have the system do it that way. Some graphical systems users indicate a desire at times to display the image at the highest quality, being willing to accept a slower response associated with a calculation for each pixel; and at other times, being willing to accept the image displayed with a lower quality texture but as rapidly as possible (which means with as much interpolation as possible). For example, in many situations there is a need for time critical rendering where there is only a fixed amount of time available to render the image. Ideally, it is preferred to have an image which, when first rendered, is an outline or simplification of the overall object. Then, as time progresses, the image coalesces toward a highly accurate representation. Applications such as this are being encountered in real-time multimedia environments where full motion video or interactive 3D graphics operate in a time limited space. In other cases, where the display has thirty (30) or more frames per second, the trick used by the film industry when the eye of the viewer does not need a full frame at each time step, can be used to reduce the time to generate a sequence of displays by reducing the level of detail displayed every other or every third frame. Methods to provide this type of functionality require dynamically modifiable texture mapping not now found in the prior art. Accordingly, the Adaptive Texture Mapping Controller of the present invention provides an adaptive, flexible control of the texture mapping mechanism, based upon a quality/performance trade-off criterion, whereby dynamic control of the texture mapping pipeline is achieved.

SUMMARY OF THE INVENTION

The present invention provides a method and apparatus for an adaptive texture mapping controller which provides a way for computer graphics system users or other functions in a graphical display system, to trade off object rendering speed for object texture quality. This trade-off is accomplished by providing a set of control signals to the adaptive texture mapping controller which indicate the level of texture quality that the user or other function desires. Upon recognizing these control signals, the adaptive texture mapping controller selects, from a collection of computation methods provided, a computation method to be used in generating pixel values necessary to provide the desired level of texture quality.

The adaptive texture mapping controller may be applied to a system having a hierarchy of levels which require image parameters to be calculated. For each level the adaptive texture mapping controller is able to determine an appropriate method for calculating the required image parameters. For a first hierarchical level, the adaptive texture mapping controller is able to determine an appropriate method for calculating the end points of span sections of scan lines to be used for the display, based upon a function of the knot parameters which correspond to the vertices which describe each edge of a polygon section of the projected object and one or more of the control signals provided. For a second hierarchical level, the adaptive texture mapping controller is able to determine an appropriate method for calculating the pixel values for pixels on each span chosen, based on a function of the span end points and one or more of the control signals provided. These functions of the distance between knots on a polygon edge or the distance between end points of a span can be mathematical functions of pairs of knots or pairs of end points respectively.

The present invention may also be embodied in a computer program product having the ability to perform the methods and processes of the invention.

DESCRIPTION OF THE DRAWINGS

The objects, features and advantages of the system of the present invention will be apparent from the following description in which.

NOTATIONS AND NOMENCLATURE

Figure 1:
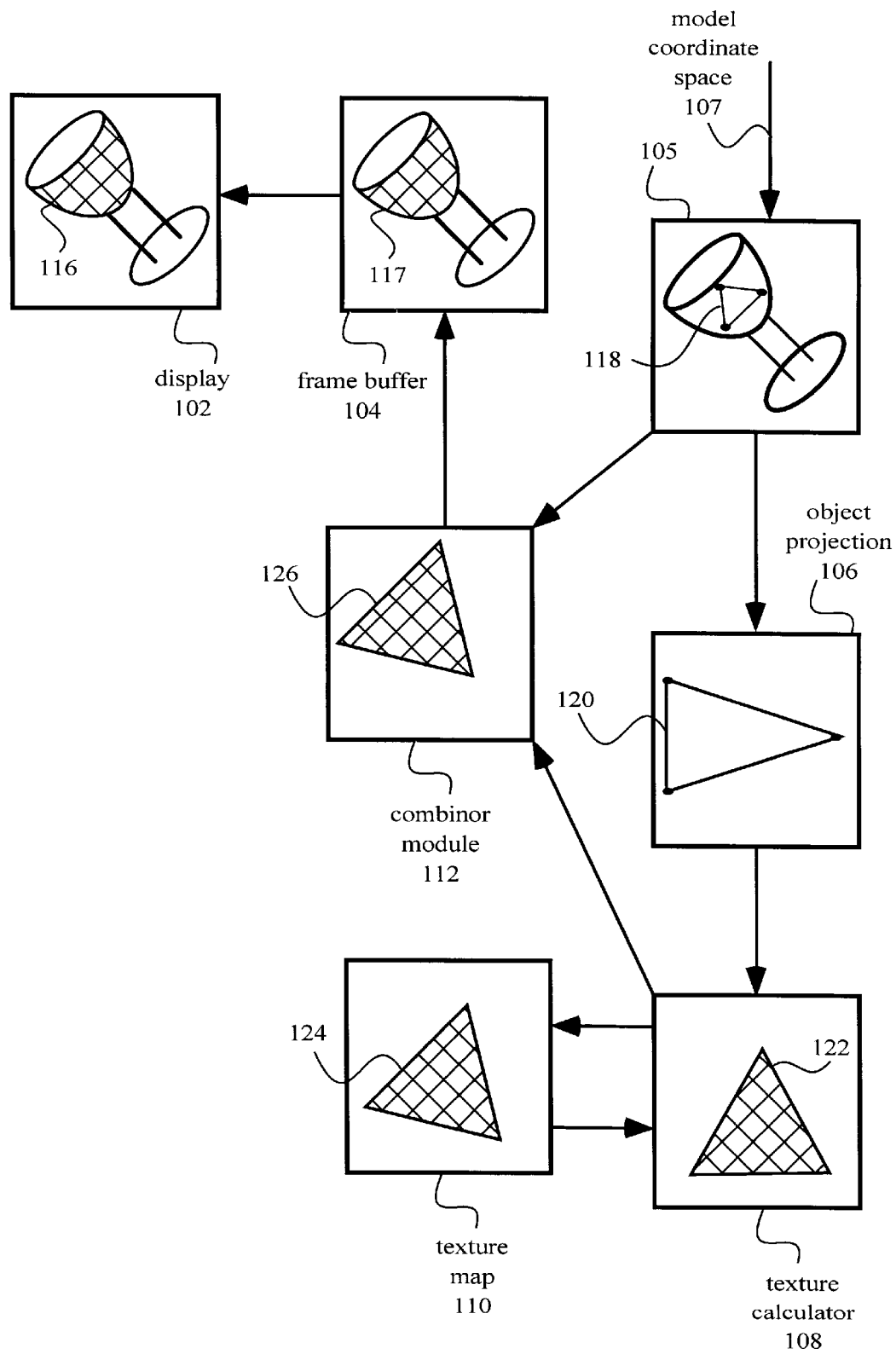
FIG. 1 illustrates a general prior art depiction of the texture mapping process.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

In the following description, for purposes of explanation, specific data and configurations are set forth in order to provide a thorough understanding of the present invention. The preferred embodiment described herein is implemented as a prototype in the XGL 3.0.1 Graphics System created by Sun Microsystems®,Inc. (Sun Microsystems is a registered trademark of Sun Microsystems, Inc.) However, it will be apparent to one skilled in the art that the present invention may be practiced without the specific details described in this implementation and may be implemented in various computer systems and in various configurations, or makes or models of tightly-coupled processors or in various configurations of loosely-coupled multiprocessor systems, or in a stand alone workstation. Moreover, it will be clear to those skilled in these arts that the present invention may be practiced without the specific details described herein. Well-known circuits and structures are not described in detail in order not to obscure the present invention.

Figure 2:
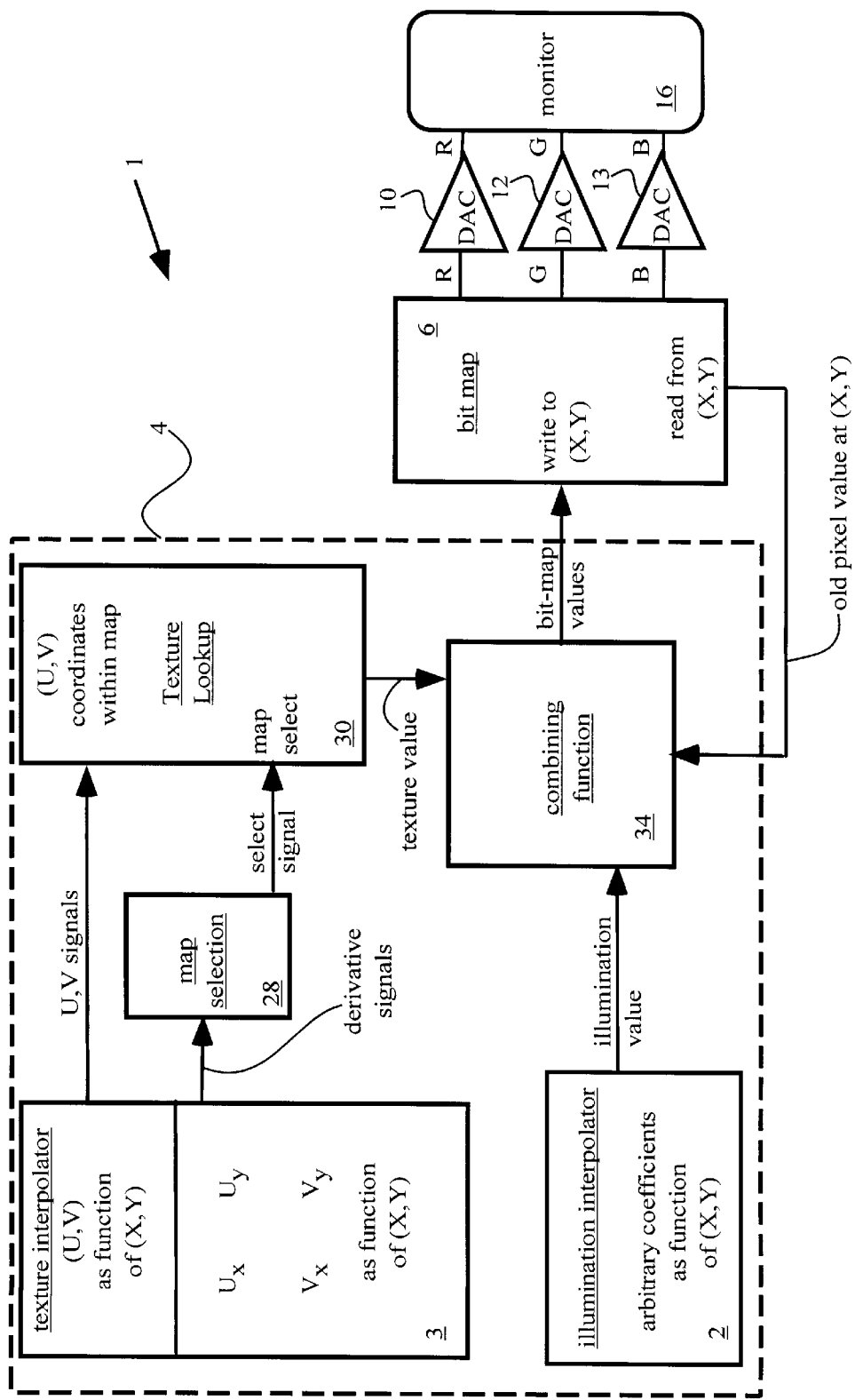
FIG. 2 illustrates a prior art hardware texture mapping system.
Figure 3:
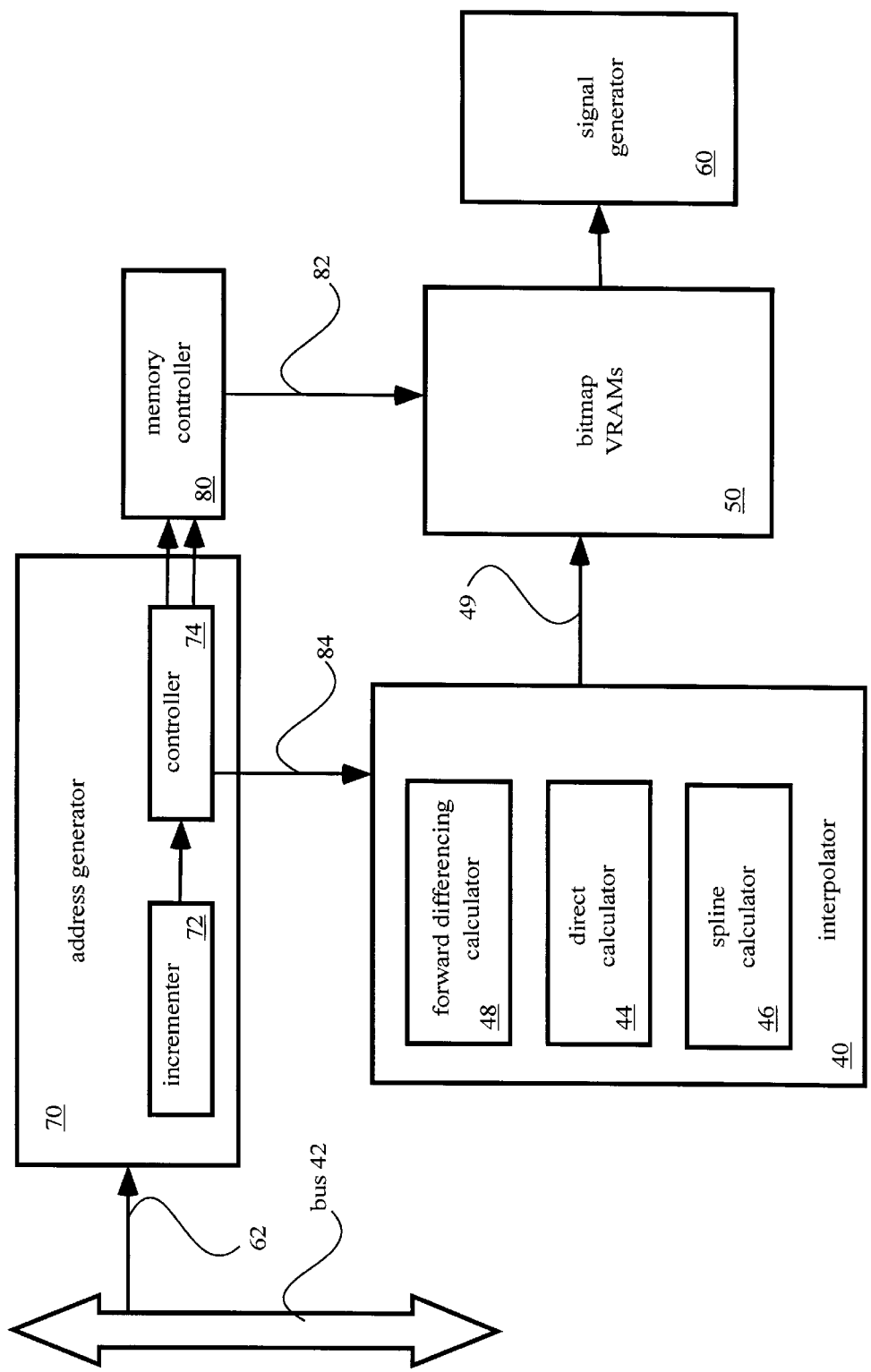
FIG. 3 illustrates a prior art hard wired interpolation system.

To illustrate a typical prior art graphics system, the Texture Mapping system of the Lathrop 427 patent is depicted in FIG. 2. Referring to FIG. 2, the texture mapping processor 4 includes an illumination value interpolation module 2, a texture parameter interpolation module 3 a texture look-up table module 30, a mip-map map selector module 28 and a combining function 34. The texture mapping processor 4 is connected to the bit-map 6 which itself is connected to the screen monitor 16. The illumination value interpolation module 4 generates values which typically include alpha, red, blue and green values, which are a function of the image's X and Y addresses of pixels associated with the image which are mapped into bitmap 6. The texture parameter interpolation module 3 generates U and V signals which are a U and V address passed to the texture look-up table module 30. The texture parameter interpolation module 3 also generates map select signals which are passed to the mip-map map selector 28, which in conjunction with the texture look-up table module 30 generate texture values which are combined with the illuminating values in the combining function 34 and then passed to the bit-map 6 for display. The interpolation modules 2 and 3 make use of interpolation devices as described in the associated 481 patent. Referring now to FIG. 3, Lathrop in the 481 patent discloses an interpolation system for shaded image generation including an address generator 70 containing an incrementer 72 and a controller 74 and which is connected to a memory controller 80 and to an electrical interpolation module 40 which is connected to a bitmap 50 which itself drives a signal generator 60. The address generator 70 receives object coordinates 62 from the Bus 42 and divides higher order primitives, such as lines and polygons, into a sequence of per-pixel operations. Incrementer element 72 transmits incremental steps along a vector to controller element 74 which transmits step information to interpolator element 40, and simultaneously transmits new address or address incrementation data to memory controller 80. The interpolation module 40 includes a forward differencing calculator 48, a direct interpolation calculator 44 and a spline interpolation calculator 46. The forward differencing calculator 48 comprises various directional calculation modes. Interpolated pixel values generated by interpolator element 40, and address bits from memory controller 80, are transmitted to VRAMs 50 where the pixel values are fed to the video signal generator 60. The interpolation processes used eliminate the necessity of calculating illumination, and texture values for each pixel in the display, and accordingly increases computational efficiency and speed.

Figure 4:
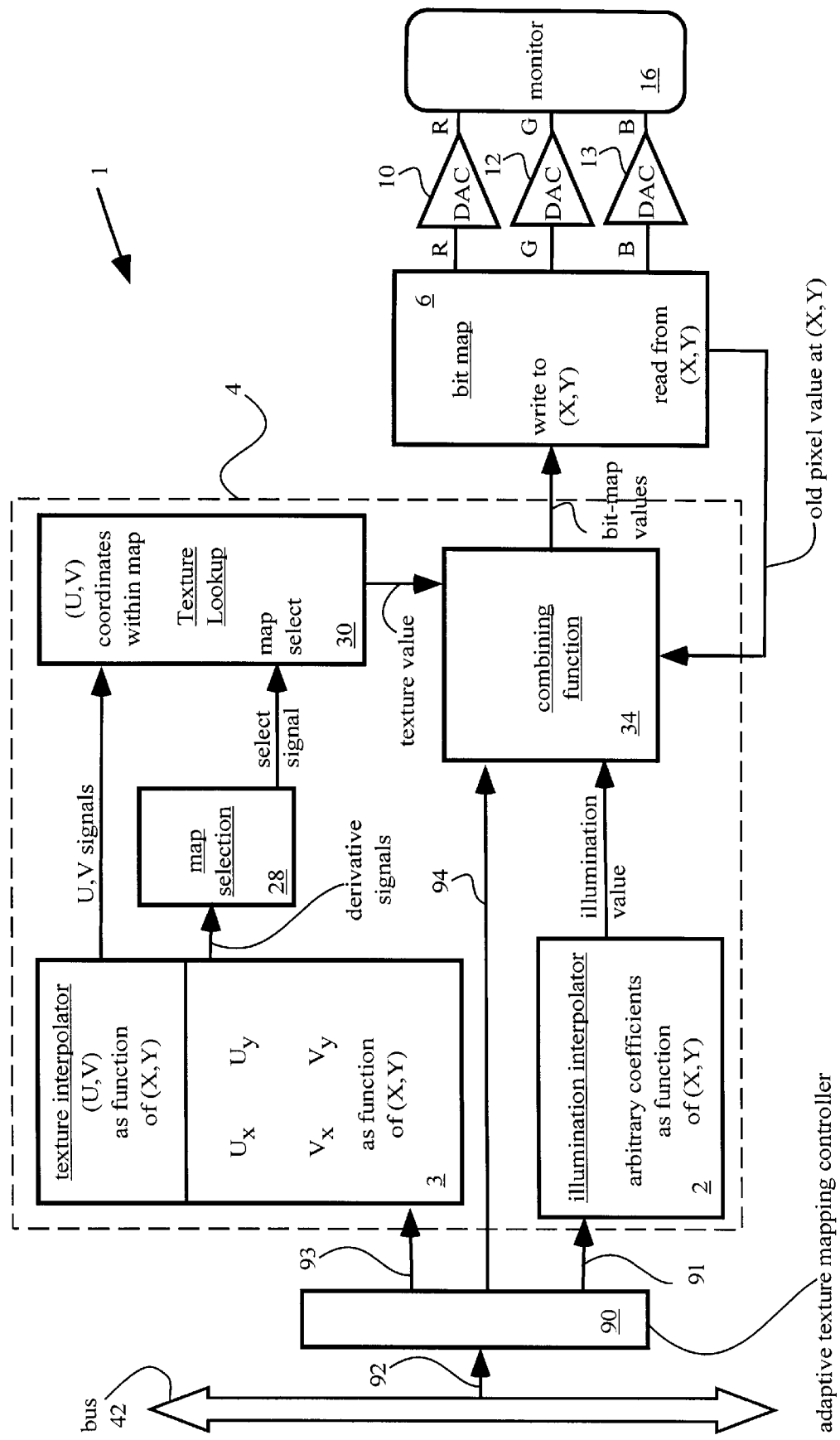
FIG. 4 depicts the texture mapping system of FIG. 2 with the addition of the Adaptive Texture Mapping Controller of the present invention.

Referring now to FIG. 4, the texture mapping system previously described in connection with the Lathrop 427 patent is shown as an example of how it would be modified by the inclusion of the present invention in an exemplary embodiment. It will be understood that this is an exemplary description for illustrative purposes. The Adaptive Texture Mapping Controller 90 of the present invention is shown coupled to the Bus 42 and to the texture manager 4 at several places 93, 94 and 95. In this exemplary embodiment, the Adaptive Texture Mapping Controller 90 would receive control signals 92 from the Bus 42, and have access to object coordinates and higher order primitives such as lines and polygons via the bus 42. The Adaptive Texture Mapping Controller 90 would determine the desired interpolation methods based upon the control signals received and would then pass the method instructions to the texture interpolation system 3 (via connection 93), to the illumination interpreter system 2 (via connection 95) or could pass data directly to the combining function 34 (via connection 94). In other graphics systems, the present invention would be similarly positioned to control the computation methods for whatever hierarchical computation levels for graphics imaging would be desirable.

In the preferred embodiment of the present invention, the approach used to control the desired degree of texture quality versus rendering speed is based on a scheme wherein every scene is divided into several hierarchical levels. For example, in a standard rendering pipeline an object consists of a set of primitives, a primitive consists of a set of spans (scanline parts), and a span consists of a set of pixels. For each of these hierarchical levels, a different approach to calculating the parameters of the involved points can be implemented. This is accomplished in the preferred embodiment of the present invention by the use of different sets of control signals for managing the selection of interpolation methods at each of these hierarchical levels.

Figure 5:
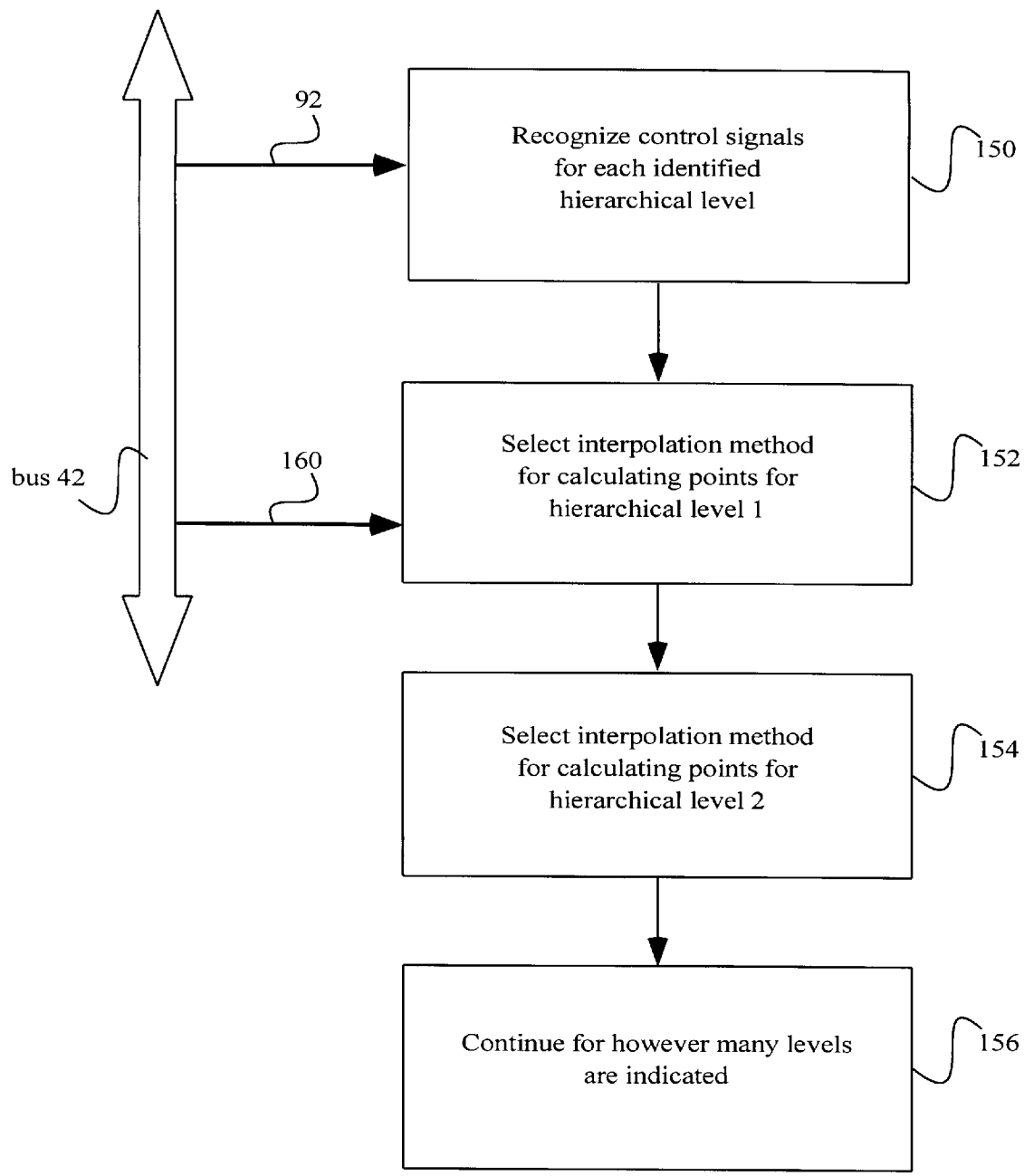
FIG. 5 depicts the major modules of the present invention.
Figure 6:
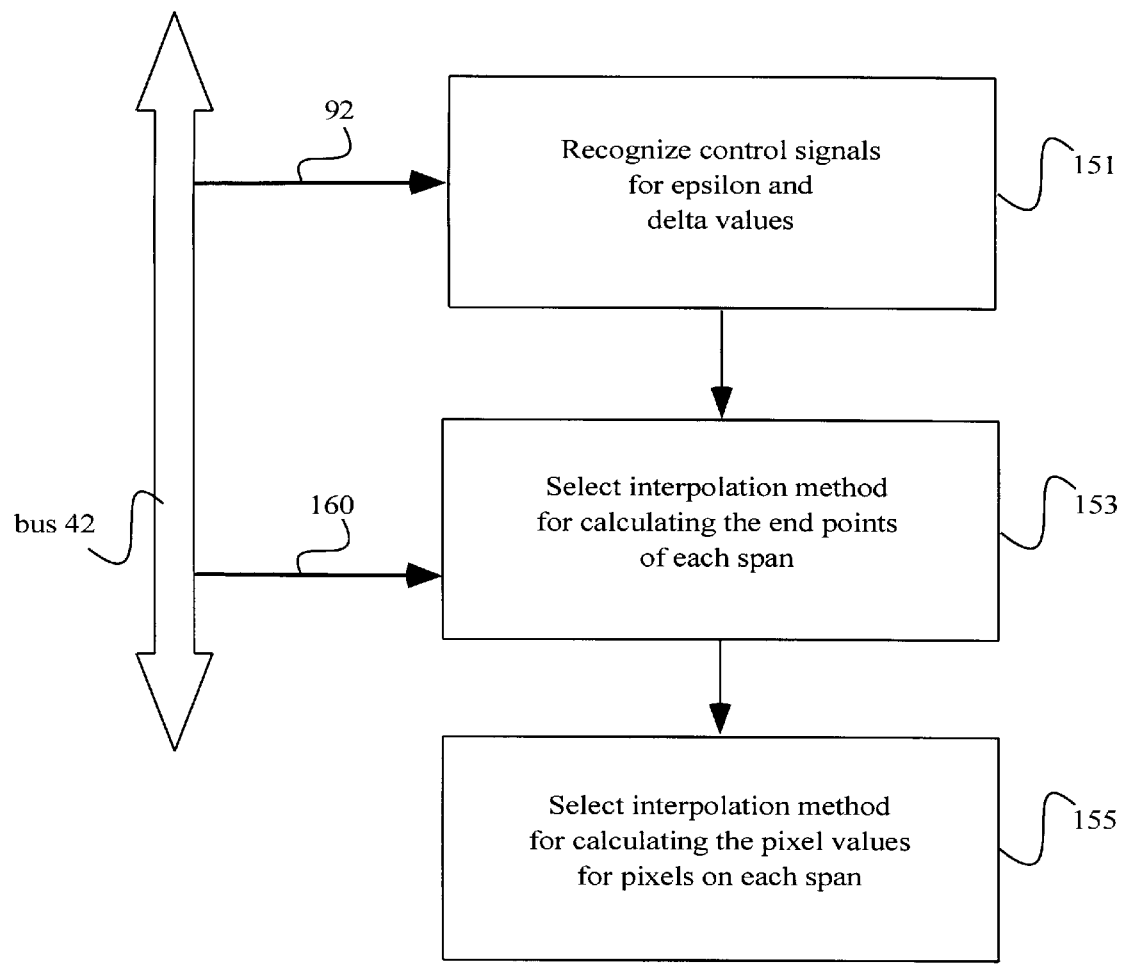
FIG. 6 depicts a specific implementation of the invention as depicted in FIG. 5.
Figure 7:
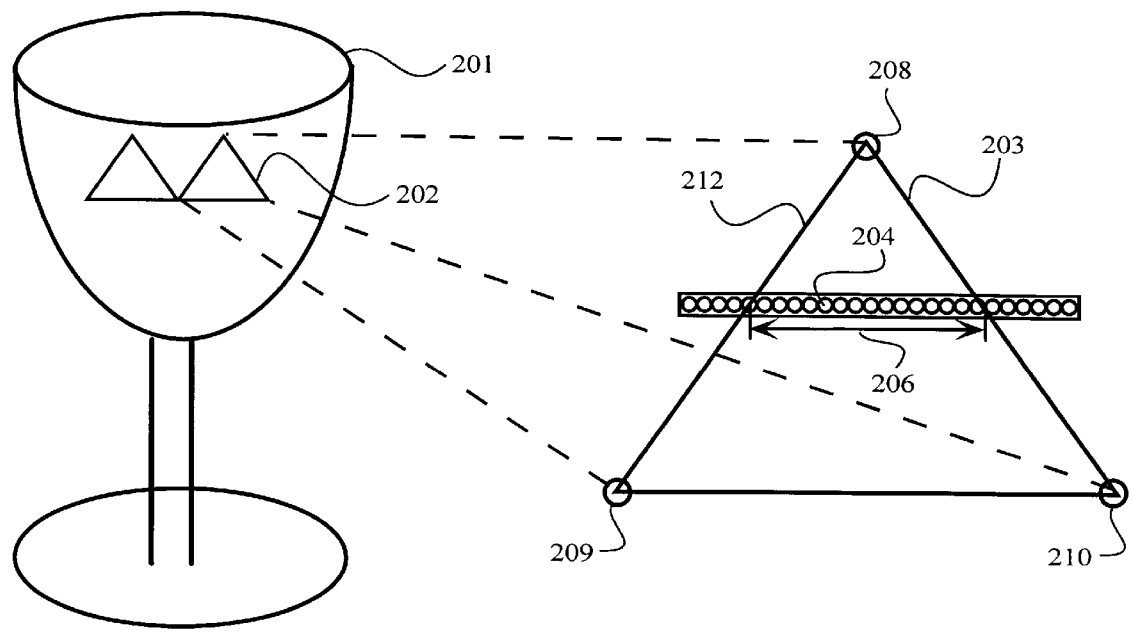
FIG. 7 depicts the present invention concepts of primitive, knots, span and pixel as used in this invention.

The mechanism of the Adaptive Texture Mapping Controller is more fully illustrated in FIGS. 5 and 6. Referring now to FIG. 5, the Adaptive Texture Mapping Controller comprises a module for recognizing control signals which represent a desired texture quality for each hierarchical level identified 150, a module for selecting an interpolation method for calculating parameters of points for hierarchical level 1 152, and a module for calculating parameters of points for hierarchical level 2 154, and additional similar modules for calculating parameters of points for each of however many levels may be defined 156. Referring now to FIG. 6, in an exemplary implementation, the module for recognizing control signals which represent a desired texture quality for each hierarchical level identified 150 (in FIG. 5), is shown recognizing control signals for Epsilon and Delta values representing two hierarchical levels 151. The module for selecting an interpolation method for calculating points for hierarchical level 1 152 (in FIG. 5), is shown selecting a method for calculating the end points of each span of a primitive 153. The module for calculating points for hierarchical level 2 154 (in FIG. 5), is shown selecting a method for calculating the pixel values on each span 155. Thus in the example of FIG. 6 there are only two levels indicated. In this example, the module for selecting an interpolation method for calculating the end points of each span section of a scan line 153 receives a set of knot parameters 160 which correspond to the vertices of a polygon section of the projected object image. An edge of the polygon is defined by two knots (vertices). Referring now to FIG. 7, these basic concepts are illustrated. An object 201 is broken up into primitives, usually polygons, lines etc. illustrated here as triangles. Triangle 202 is shown projected onto a larger image 203 and is shown with vertices of the triangle 208, 209 and 210. The vertices 208, 209 and 210 of the triangle are also called knots. The sides of the triangle, also called edges, are defined by two vertices. For example, vertices (knots) 208 and 209 define the line (edge) 212 between them. Also illustrated in FIG. 7 is a scan line 205 (representing a scan line of a CRT display), and the span 206 of this scan line which is the portion of the scan line inside the triangle. The span 206 is made up of a number of pixels 204. These pixels 204 on the span 206 are the pixels for which pixel values must be calculated for display on the object. This concept is important in understanding the texture mapping process employed because the process hinges on some means of defining, for a fixed point on a geometrical object, parameters belonging to the parameter coordinate space. This process begins with the initial binding of the texture map to the geometrical object, usually in a model coordinate space. A relatively small set of geometrical object points are chosen, called knots, and for every point in this set, appropriate parameters are defined. Any number of knots greater than one can be used to define an object for processing purposes. Current graphics systems typically use only two knots in the interpolating computation of mapping coordinates. This is because in current computer graphics systems, all information is eventually reduced to individual scanlines, and only a two-knot interpolating scheme is needed to define the intermediate points along the scanline. Additionally, there exist several methods which can reduce any trivariate or higher interpolation method down to a composition using only two knot points with appropriate additional information. Those skilled in these arts will recognize that although the descriptions included herein are in terms of two knot interpolation methods, the present invention may be practiced with various other configurations.

Figure 8:
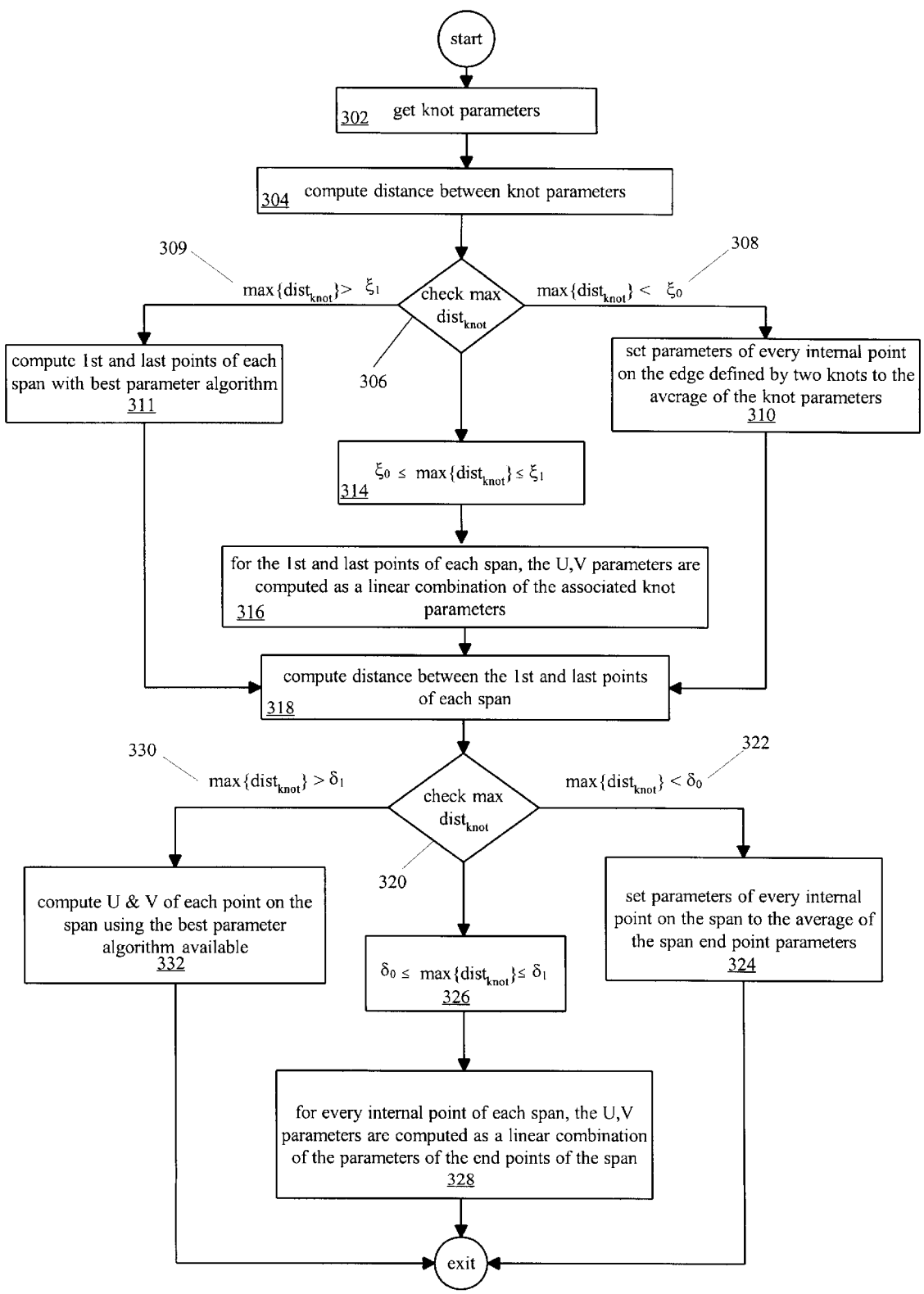
FIG. 8 is a flowchart of the interpolation method selection process of the present invention.

Referring now to FIG. 8, the preferred embodiment of the detail calculations of the present invention, as used in the modules to control the selection of various interpolation methods for each exemplary hierarchical level are illustrated. The level 1 process begins with the step of obtaining the objects knot parameters 302. Initially, the distance between each set of knot parameters is calculated 304. Those skilled in the art will recognize that this "distance" may be defined in a number of ways, that is Euclidean, Manhattan, minimum, maximum, integral, etc. In general, dist($S_1$, $S_2$) is the distance between set $S_1$ and set $S_2$. Having calculated the distances between all pairs of knot parameters, the maximum of these distances is compared to the first set of control signals $\xi_0$ and $\xi_1$ 306. If "MAX $\{dist_{knot}\}<\xi_0$" 308 then the parameters of every internal point on the edge (which points define the end points of a span of a scan line) defined by two knots, are set to the "average" of the knot parameters. 310 In the preferred embodiment, this "average" is calculated as the arithmetic mean of the two knot values. Those skilled in the art will recognize that other methods may be used to calculate this "average". If this leg 310 of the interpolation method selection is chosen, the next step in the process is to calculate the first and last points (the end points) of each span 318. However, before proceeding to describe this level 2 step 318 and those that follow, the alternate legs of the test for the maximum distance between knot points in the level 1 section are described. If "$\xi_0 \leq$ MAX $\{dist_{knot}\} \leq \xi_1$" 314 then the parameters of every internal point on the edge (which points define the end points of a span of a scan line) defined by two knots, are calculated as merely a linear combination of the two knot points 316. In the preferred embodiment the linear combination is calculated as follows:

T(i)=T(i−1)+α*DELTA, for i=0, 1, . . . , n−1;

where

T(0)—is an edge first vertex parameter,

T(n−1)—is an edge second vertex parameter;

T(i)—is the parameter of the i-internal point of the edge;

α—is a constant coefficient is equal 1/n;

n—is an number of the points in the edge;

DELTA—is equal T(n−1)−T(0).

Those skilled in the art will recognize that other methods for calculating a "linear combination" of the knot points may be used.

If "MAX $\{dist_{knot}\}>\xi_1$" 309, then the first and last point of each span is calculated with the best parameter algorithm available 311. In the preferred embodiment, the "best parameter algorithm available" is the following:

T(i)=NUM(i)/DENOM (i),

NUM(i)=NUM(i−1)+α*DELTA_NUM,

DENOM(i)=DENOM(i−1)+α*DELTA_DENOM, i=0, 1, . . . , n−1;

where

T(0)—is an edge first vertex parameter,

T(n−1)—is an edge second vertex parameter;

T(i)—is the parameter of the ith-internal point of the edge;

α—is a constant coefficient is equal 1/n;

n—is the number of the points in the edge;

NUM(i)—is a numerator of the ith-internal point of the edge;

NUM(0)—is equal to T(0)/W(0);

DENOM(i)—is the denominator of the ith-internal point of the edge;

DENOM(0)—is equal to T(0)/W(0);

DELTA_NUM—is equal to T(n−1)/W(n−1)−T(0)/W(0);

DELTA_DENOM—is equal to 1/W(n−1)−1/W(0).

Those skilled in the art will recognize that other similar algorithms may be used.

Having determined the parameters for the end points of all spans desired to be used in this texture rendering process, the interpolation selection module of the present invention then proceeds to the next hierarchical level in this example, the selection of parameters for pixels on each span required for the desired texture quality. These selections are made based upon another set of control signals, for example $\delta_0$ and $\delta_1$. As in the previous calculation, the first step is to compute the distance between the end points of each span 318. Next the maximum distance for a span is found 320 and compared to the control signals $\delta_0$ and $\delta_1$, to select an appropriate interpolation scheme. If "MAX $\{dist_{span}\}<\delta_0$" the parameters of every internal point (every pixel) on the span are set to the average of the span end point parameters 324. In the preferred embodiment, the "average" is the arithmetic mean. If "$\delta_0 \leq \text{MAX } \{\text{dist}_{span}\} \leq \delta_1$" 326 then the parameters of every internal point (every pixel) on the span are set to a linear combination of the span end point values 328. In the preferred embodiment, the "linear combination of the span end point values" is calculated as follows:

T(i)=T(i-1)+α*DELTA, i=0, 1, . . . , n-1;

where

T(0)—is a span's start point parameters;

T(n-1)—is a span's end point parameters;

T(i)—is the parameter of the ith-internal point of the span;

α—is a constant coefficient is equal 1/n;

n—is the number of the points in the span;

DELTA—is equal to T(n-1)-T(0).

If "MAX $\{\text{dist}_{span}\} > \delta_1$" 330 then the parameters of every internal point (every pixel) on the span are computed using the best parameter algorithm available 332. In this case, the "best parameter algorithm available" is as follows:

T(i)=NUM(i)/DENOM (i),

NUM(i)=NUM(i-1)+α*DELTA_NUM,

DENOM(i)=DENOM(i-1)+α*DELTA_DENOM, i=0, 1, . . . , n-1;

where

T(0)—is a span's start point parameter,

T(n-1)—is a span's end point parameter,

T(i)—is the parameter of the ith-internal point of the current span;

α—is a constant coefficient is equal 1/n;

n—is an number of the points in the current span;

NUM(i)—is a numerator of the ith-internal point of the current span;

NUM(0)—is equal T(0)/W(0);

DENOM(i)—is a denominator of the i-internal point of the current span;

DENOM(0)—is equal T(0)/W(0);

DELTA_NUM—is equal T(n-1)/W(n-1)-T(0)/W(0);

DELTA_DENOM—is equal 1/W(n-1)-I/W(0).

Those skilled in these arts will realize that currently, most hardware algorithms use a linear interpolation along each primitive edge to find the parameters for the first and last points of each span. This would correlate to control signal values in the described example of the present invention of $\xi_0=0$, and $\xi_1=\infty$. To achieve the highest quality (but slowest performance), control signal values of $\xi_0=\xi_1=0$, and $\delta_0=\delta_1=0$ would be chosen. Intermediate values for the epsilon and delta control signals will dynamically modify the texture quality/rendering performance scenario, while giving the user more control of the texturing process than previously available in hard coded algorithms. It will be recognized that extensions of this model could include multi-knot parameter computations, such as higher order polynomials and non-linear interpolation.

While the invention has been described in conjunction with a preferred embodiment, it is evident that numerous alternatives, modifications and variations and uses will be evident to those skilled in the art in light of the foregoing description.

What is claimed is:

1. In a computer graphics system for generating and displaying images of objects on a display device, the images including pixels having pixel values, the images being defined by signals representative of the pixel values, the system including elements for processing the signals to modify the images displayed on the display device including, interpolation elements for generating pixel values representative of bitmap image values, which are representative of texture of a given object, the improvement comprising an adaptive texture mapping controller which comprises:

a first mechanism configured to recognize a control signal representing a desired quality of texture for an image of an object, said desired quality of texture ranging from a minimum to a maximum amount of texture provided by said graphics system, said control signal including a plurality of image control values that are selectable by a user, said plurality of image control values being useful in selecting a desired object image rendering speed and image texture quality;

one or more linear and one or more non-linear interpolation mechanisms coupled to said first mechanism for selecting pixels;

a plurality of computation mechanisms couples to said first mechanism for computing values representing image parameters for the selected pixels;

a plurality of hierarchical levels of image parameter computation in which each said hierarchical level requires values representing image parameters to be calculated with a particular interpolation mechanism; and a computation method selection device, coupled to said first mechanism and using said control signal for selecting one of said interpolation mechanisms and one of said plurality of computation mechanisms to be used in generating pixel values necessary to provide said desired quality of texture, said computation method selection device including logic mechanisms that use selected ones of said plurality of image control values for selecting one of said interpolation mechanisms for calculating first hierarchical level values representing image parameters for a first hierarchical level of image parameter computation, said computation method selection device also including logic mechanisms that use selected ones of said plurality of image control values for selecting one of said interpolation mechanisms for calculating second hierarchical level values representing image parameters for a second hierarchical level of image parameter computation based upon said first hierarchical level values, whereby a user can trade-off object image rendering speed for object image texture quality by providing said control signal to the adaptive texture mapping controller.

2. The adaptive texture mapping controller of claim 1 wherein the logic mechanisms for selecting one of said interpolation mechanism for calculating first hierarchical level values representing image parameters for a first hierarchical level of image parameter computation further comprises, a logic mechanism for selecting a computation mechanism for calculating values representing image parameters for end points of a span of a scan line.

3. The adaptive texture mapping controller of claim 2 wherein said logic mechanism for selecting a computation mechanism for calculating values representing image parameters for end points of a span of a scan line, bases said selection of a computation mechanism upon a relation between a maximum distance between knot parameters and said control signal.

4. The adaptive texture mapping controller of claim 3 wherein said maximum distance between knot parameters can be a mathematical function of values representing image parameters of said knots.

5. The adaptive texture mapping controller of claim 1 wherein the logic mechanisms for selecting one of said interpolation mechanism for calculating second hierarchical level values representing image parameters for a second hierarchical level of image parameter computation further comprises, a logic mechanism for selecting a computation mechanism for calculating values representing image parameters for selected pixels on a span of a scan line.

6. The adaptive texture mapping controller of claim 5 wherein the logic mechanisms for selecting a computation mechanism for calculating values representing image parameters for selected pixels on a span of a scan line, bases said selection of a computation mechanism upon a relation between a maximum distance between end points of said span and said control signal.

7. The adaptive texture mapping manager of claim 6 wherein said maximum distance between end points of said span can be a mathematical function of values representing image parameters of said end points.

8. In a computer graphics system for generating and displaying images of objects on a display device, the images including pixels having pixel values, the images being defined by signals representative of the pixel values, the system including elements for processing the signals to modify the images displayed on the display device including, interpolation elements for generating pixel values representative of bitmap image values, which are representative of texture of a given object, and a plurality of hierarchical levels in which each said hierarchical level requires values representing image parameters to be calculated with a particular interpolation mechanism, a method for variable control of texture quality for display on a given graphics object, said method comprising the steps of:

providing an adaptive texture mapping controller;

providing one or more linear and one or more non-linear interpolation methods coupled to said adaptive texture mapping controller for computing values representing image parameters; recognizing by said adaptive texture mapping controller, a control signal representing a desired quality of texture for an image of an object, said desired quality of texture ranging from minimum texture to a maximum amount of texture provided by said graphics system, said control signal includes a plurality of image control values selectable by a user in order to select a desired object image rendering speed and image texture quality;

using selected ones of said plurality of image control values included in said control signal for selecting one of said interpolation methods to be used in generating pixel values necessary to provide said desired quality of texture, said selected interpolation method calculates values representing first hierarchical level parameter values for a first hierarchical level of image parameter computation: and using selected ones of said plurality of image control values included in said control signal for selecting one of said interpolation methods to be used in generating pixel values necessary to provide said desired quality of texture, said selected interpolation method calculates values representing second hierarchical level parameter values for a second hierarchical level of image parameter computation based upon said first hierarchical level parameter values, whereby a user can trade-off object image rendering speed for object image texture quality by providing said control signal to the adaptive texture mapping controller.

9. The method of claim 8 wherein the step of selecting one of said interpolation method for calculating values representing first hierarchical level parameter values for said first hierarchical level of image parameter computation further comprises a step of selecting an interpolation method for calculating values representing parameter values for end points of a span of a scan line.

10. The method of claim 9 wherein the step of selecting an interpolation method for calculating values representing image parameters for end points of a span of a scan line, bases said selection of an interpolation method upon a relation between a maximum distance between knot parameters and said control signal.

11. The method of claim 10 wherein said maximum distance between values representing knot parameters can be a mathematical function of said values representing knot parameters.

12. The method of claim 11 wherein the step of selecting one of said interpolation method for calculating values representing second hierarchical level parameter values for a second hierarchical level of image parameter computation further comprises a step of selecting one of said interpolation method for calculating values representing parameter values for selected pixels on a span of a scan line.

13. The method of claim 12 wherein the step of selecting an interpolation method for calculating values representing parameter values for selected pixels on a span of a scan line, bases a selection of an interpolation method upon a relation between a maximum distance between end points of said span and said control signal.

14. The method of claim 13 wherein said maximum distance between end points of said span can be a mathematical function of values representing image parameters of said end points.

15. A computer program product embodied on a computer usable medium for controlling speed and quality of texture mapping rendered by a computer graphics system for generating and displaying images of objects on a display device, the images including pixels having pixel values, the images being defined by signals representative of the pixel values, the system including elements for processing the signals to modify the images displayed on the display device including, interpolation elements for generating pixel values representative of bitmap image values, which are representative of texture of a given object, said computer program product comprising:

an adaptive texture mapping controller, one or more linear and one or more non-linear interpolation mechanisms coupled to said adaptive texture mapping controller for selecting pixels;

a plurality of computation mechanisms coupled to said adaptive texture mapping controller for computing values representing image parameters for selected pixels;

a plurality of hierarchical levels in which each said hierarchical level requires values representing image parameters to be calculated with a particular interpolation mechanism;

a first mechanism configured to permit said adaptive texture mapping controller to recognize a control signal representing a desired quality of texture which is to be mapped to an object image, said desired quality of texture ranging from minimum to a maximum amount of texture provided by said graphics system, said control signal includes a plurality of image control values selectable by a user, said plurality of image control values being useful in selecting a desired object image rendering speed and image texture quality, said first mechanism includes a third mechanism configured to permit the selection of an interpolation mechanism for calculating first hierarchical level values representing parameter values for a first hierarchical level of image parameter computation; and a second mechanism configured to permit said adaptive texture mapping controller to use said control signal for selecting one of said interpolation mechanisms and one of said plurality of computation mechanisms to be used in generating pixel values necessary to provide said desired quality of texture, said second mechanism includes a fifth mechanism configured to select an interpolation mechanism for calculating second hierarchical level values representing parameter values for a second hierarchical level of image parameter computation based upon said first hierarchical level values, whereby a user can trade-off object image rendering speed for object image texture quality by providing said control signal to the adaptive texture mapping controller.

16. The computer program product of claim 15 wherein the third mechanism configured to permit the selection of an interpolation mechanism for calculating values representing first hierarchical level parameter values for a first hierarchical level of image parameter computation further comprises a fourth mechanism configured to select an interpolation mechanism for calculating values representing parameter values for end points of a span of a scan line.

17. The computer program product of claim 16 wherein the fourth mechanism configured to select an interpolation mechanism for calculating values representing parameter values for end points of a span of a scan line, bases a selection of an interpolation mechanisms upon a relation between a maximum distance between values representing knot parameters and said control signal.

18. The computer program product of claim 17 wherein said maximum distance between knot parameters can be a mathematical function of said values representing knot parameters.

19. The computer program product of claim 15 wherein said fifth mechanism configured to select an interpolation mechanism for calculating values representing second hierarchical level parameter values for a second hierarchical level of image parameter computation further comprises a sixth mechanism configured to select an interpolation mechanism for calculating values representing parameter values for selected pixels on a span of a scan line.

20. The computer program product of claim 19 wherein said sixth mechanism configured to select an interpolation mechanism for calculating values representing parameter values for selected pixels on a span of a scan line, bases a selection of an interpolation mechanism upon a relation between a maximum distance between values representing end points of said span and said control signal.

21. The computer program product of claim 20 wherein said maximum distance between values representing end points of said span can be a mathematical function of values representing parameters of said end points.

* * * * *